Dec. 26, 1967 R. M. WYMAN 3,360,065
POWER CULTIVATOR
Filed July 16, 1965 4 Sheets-Sheet 1

INVENTOR.
RICHARD M. WYMAN
BY
*Porter & Meyer*
ATTORNEYS

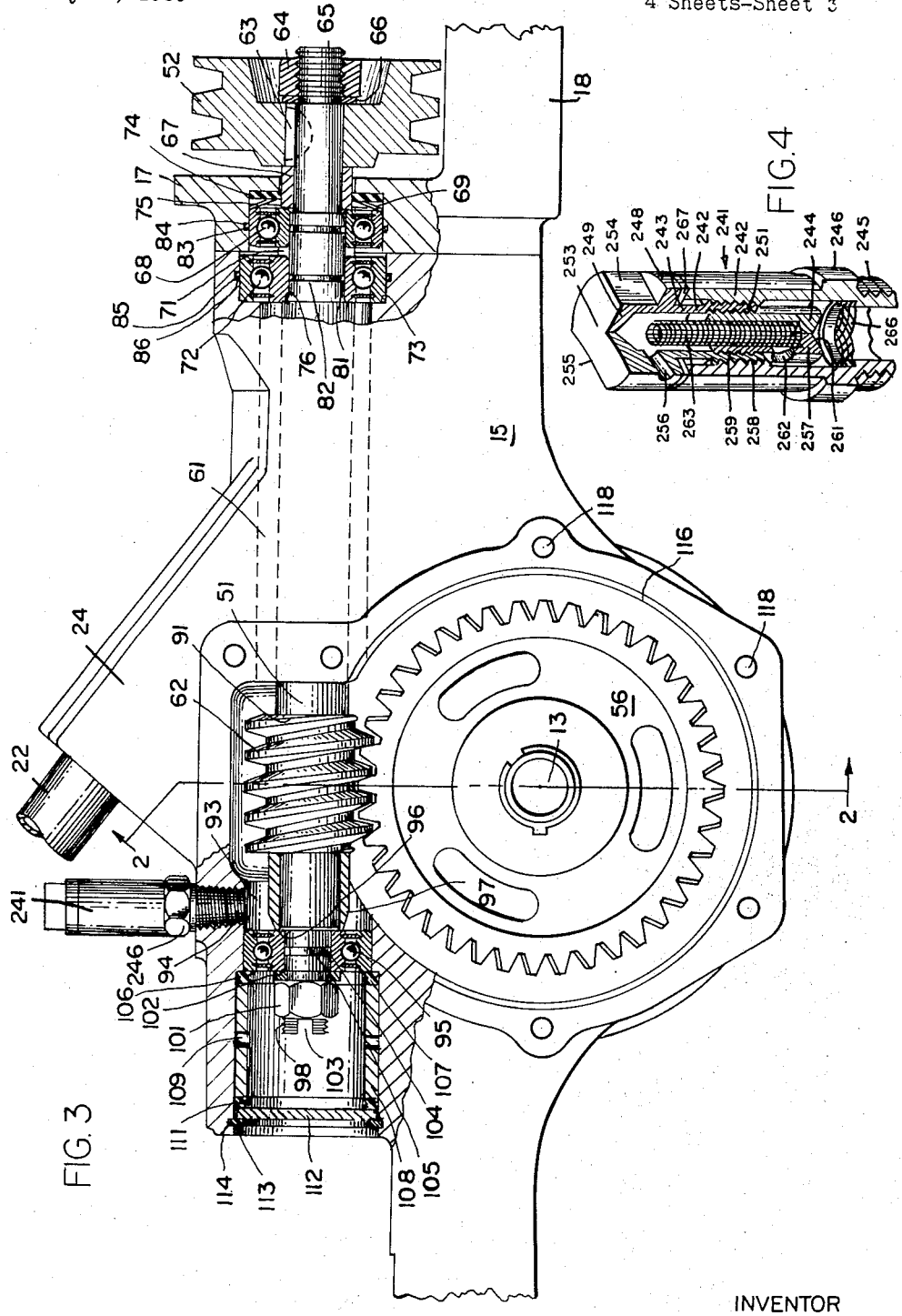

Dec. 26, 1967

R. M. WYMAN 3,360,065

POWER CULTIVATOR

Filed July 16, 1965

INVENTOR
RICHARD M. WYMAN

BY,

Porter & Meyer

ATTORNEYS

United States Patent Office 3,360,065
Patented Dec. 26, 1967

3,360,065
POWER CULTIVATOR
Richard M. Wyman, 14 Burr St.,
Framingham, Mass. 01701
Filed July 16, 1965, Ser. No. 472,608
4 Claims. (Cl. 180—19)

ABSTRACT OF THE DISCLOSURE

A single wheel power cultivator especially adapted for use under adverse conditions wherein positive means are provided to prevent entry of dirt into the working parts and to minimize wear.

---

This invention relates to a single wheel power cultivator or power hoe. It especially relates to such a power cultivator especially adapted for continuous, heavy duty service under commercial agricultural conditions.

Some years ago a single drive wheel light weight garden tractor was developed by one Carl Van Ausdall of Liberty, Indiana and described in U.S. Patent 2,535,614 and U.S. Patent 2,535,615 issued to the said Carl Van Ausdall on Dec. 26, 1950. As set forth in the initial paragraph in these patents this garden tractor was designed especially for home use or limited commercial application wherein are desired the advantages of low cost, light weight, easy manipulation and diversity of services.

The Van Ausdall garden tractor, even though initially designed for the attachment of numerous couplements such as plows, cultivators, lawn mowers, lawn rakes, lawn rollers and the like, proved to be extraordinarily useful as a cultivator especially in commercial nurseries. Here its light weight, its small size and its maneuverability permitted a closer spacing of nursery stock than heretofore had been possible where a draft animal or other type of tractor had been used to pull a cultivator. The good balance, the ease of maneuverability, the excellent traction inherent in the Van Ausdall design permitted the Van Ausdall tractor to be used as a cultivator by a single person for long hours without undue fatigue.

It is the object of this invention to provide a power cultivator of the Van Ausdall type wherein:

Abrasive, corrosive and wear-causitive materials are positively sealed away from vital working parts.

The lubricant is positively sealed within its designated space.

The working parts are attached and suspended so as to utilize to a minimum of wear between parts.

Wear is caused to be borne chiefly by the lesser and less expensive of mating parts.

Shocks ordinarily caused by backlash between parts are lessened.

Ball bearings are kept under positive axial load at all times, thereby prolonging the useful life of such bearings.

The parts may be easily dis-assembled without danger of damage to either the parts or the machine from which the parts are removed and may be easily re-assembled all with the aid of common tools usually at hand and easily available.

Routine maintenance is made simple and economical.

Low operating temperatures are maintained which in turn are conducive to the long life of parts.

It is a further object of this invention to provide a dust and grit preventing air breather for an oil sump.

It is a further object of this invention to provide a simple and inexpensive tool for setting and pulling wheels and for depressing clutch springs.

These and other features and objects of the present invention will better be understood by reference to the detailed description which follows, and to the drawings in which:

FIG. 3 is an elevation partially in section along the axis of the worm shaft as indicated generally by line 3—3 in FIG. 2.

FIG. 4 is an elevation in perspective and partially in section of the oil filler and breather cap.

Figure 1:
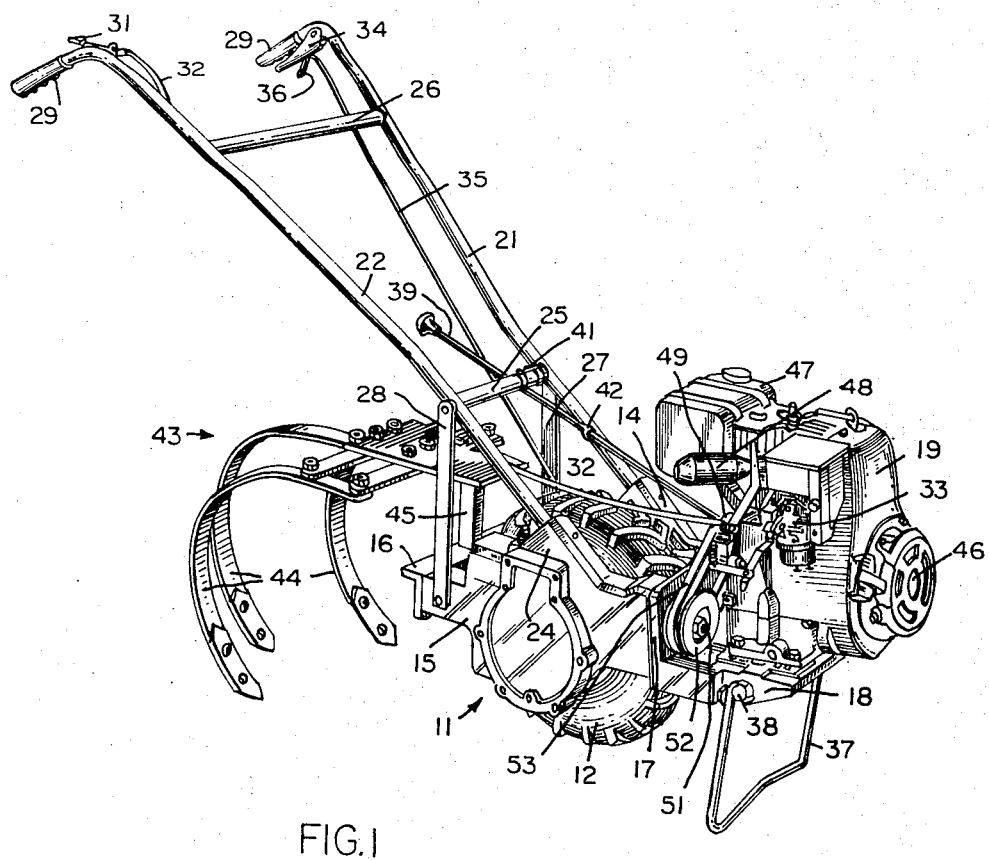
FIG. 1 is an over-all view in perspective showing the power cultivator of the present invention.

As shown in FIG. 1 the power cultivator 11 incorporating the present invention comprises a traction wheel 12 mounted on axle 13 which in turn is mounted between parallel side frame castings 14 and 15. Left hand side frame 14 and right hand side frame 15 are fastened together by means of rear cross brace 16 which extends from the rear of one side frame to the rear of the other side frame behind wheel 12, and a front cross brace 17 which extends from side to side in front of wheel 12. A forward extension 18 of front cross brace 17 serves as a mounting plate for motor 19. To facilitate assembly and disassembly of power cultivator 11 frame 14 is fastened to cross braces 16 and 17 by bolts and may be removed.

A pair of upwardly and outwardly extending handles 21 and 22 are provided suitably mounted on upward extensions 23 and 24 of frame members 14 and 15 respectively. Handles 21 and 22 are joined laterally by cross braces 25 and 26 and are additionally supported from the rearward frame 14 and 15 by vertical support braces 27 and 28 respectively. The outer ends of handles 21 and 22 are each provided with hand grips 29.

Right hand handle 22 is provided with a throttle control lever 31 which is connected by flexible wire 32 to the carburetor 33 of motor 19. Left hand handle 21 is provided with clutch actuating lever 34 which is connected by means of a clutch actuating rod 35 to the clutch mechanism. A clutch actuating lever lock 36 is provided associated with clutch actuating lever 34 to lock the clutch in a released position when desired.

A retractable generally U-shaped stand 37 which extends from one side of motor mounting plate 18 to the other and is pivotally mounted thereto as indicated at 38 is provided to keep the cultivator 11 in an upright position when not in use. It will be noted that since motor 19 is mounted in front of the single traction wheel 12 the center of gravity of cultivator 11 is well in front of transverse axle 13. A stand actuating rod 39 which passes through bracket 41 on cross brace 25 and bracket 42 on handle 21 and connects with a linkage (not shown) associated with stand 37 is provided so that the operator may swing stand 37 into and out of cultivator supporting position.

As shown in FIG. 1 the power cultivator 11 of the present invention is provided with a tined harrow 43 provided with three tines 44. Harrow 43 is attached to rear cross base 16 by means of bracket 45. It will be understood that a variety of other implements can be similarly attached to the power tractor units indicated generally at 11.

Motor 19 is a small horsepower gasoline engine of the conventional type. As shown it is provided with a starter unit 46, a fuel tank 47, a muffler 48 and drive shaft pulleys 49. It will be understood, of course, that any conventional power unit having a rotating power shaft can be employed instead of motor 19.

Figure 2:
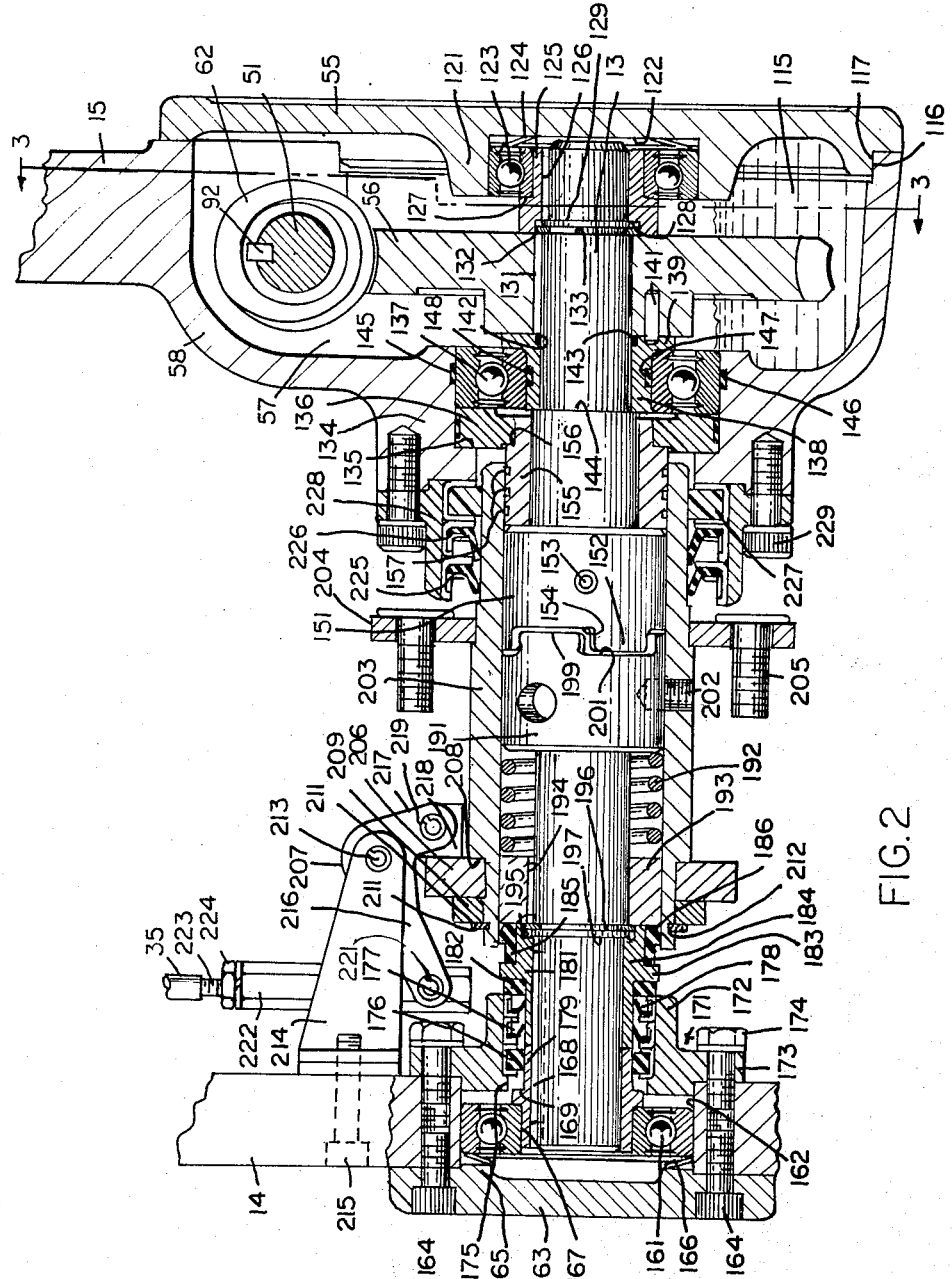
FIG. 2 is an electrical section along the axis of the axle shaft as indicated generally by line 2—2 in FIG. 3.

The power output of motor 19 is transmitted to traction wheel 12 by means of a drive unit that includes drive shaft 13 and worm shaft 51. A pair of exposed worm shaft drive sheaves 52 are provided which are connected to drive shaft pulleys 49 and motor 19 by means of a pair of drive belts 53. Details of the drive unit are shown in FIGS. 2 and 3.

Axle 13 extends between cast left side frame 14 and cast right side frame member 15 where it is rotatably mounted on cover plate 55. Drive gear 56 which is mounted on axle 13 is positioned within a cavity 57 provided for that purpose in frame 15 and located between the inner wall 58 of frame 15 and cover plate 55.

Worm shaft 51 extends at right angles to drive shaft 13 above drive shaft 13 longitudinally of cast right side frame member 15 in a cavity 61 provided for that purpose. Worm gear 62 is mounted on worm shaft 51 in mating and cooperating relationship with drive gear 56.

Worm shaft 51 at one end extends through an aperture provided for that purpose in front cross brace 17 for sufficient distance to provide for the attachment of worm shaft drive sheaves 52. Sheaves 52 are keyed to shaft 51 by means of key 63 and are held in place by nut 64 which cooperates with threaded portion of 65 provided at the end of shaft 51, and by cooperating lock washer 66.

A cylindrical spacer 67 which surrounds worm shaft 51 in close association thereto is provided abutting the inner edge of sheaves 52. Spacer 67 passes freely through the aperture in front cross brace 17 and abuts the outer edge of the inner race of anti-friction bearing 68. Anti-friction bearing 68 is a ball bearing provided with integral oil seals and is mounted in bearing cage 69 provided for that purpose in front cross brace 17. A second spacer 71 closely associated with shaft 51 abuts the inner edge of the anti-friction bearing 68 and the outer edge of the inner race of anti-friction bearing 72. Anti-friction bearing 72 is likewise a ball bearing provided with integral seals and is mounted in a bearing cage 73 provided for that purpose in the outer wall of frame 15 at the end of cavity 61.

A water and dirt seal 74 is provided in the side wall of cage 69 with its inner edge in abutting contact with spacer 67. A bearing loading spring 75 is provided between the inner edge of seal 74 and the outer edge of the outer race of bearing 68. The inner edge of the outer race of bearing 72 abuts against the edge of cage 73. The inner edge of the inner race of bearing 72 abuts against shoulder 76 provided on shaft 51. A sealing gasket is provided between the mating walls of frame 15 and cross-brace 17.

The inner race of bearing 68 is in contact with O ring 77 which is mounted in groove 78 provided in shaft 51. O ring 77 acts both as an oil seal and to insure that the inner race of bearing 68 is rotationally locked to shaft 51 in order to prevent relative slippage and the resulting wear. A similar O ring 81 is provided in groove 82 for contact with the inner race of bearing 72. The outer race of bearing 68 is similarly provided with O ring 83 in groove 84, cage 69 and the outer race of bearing 72 is provided with O ring 85 in groove 86 in the wall of cage 73.

At the other end of shaft 51, the inner edge of worm 62 abuts shoulder 91 provided in shaft 51 for that purpose and is keyed onto shaft 51 by means of key 92. Beyond the location of worm 62 an access tunnel 93 is provided in frame 15 axially of shaft 51 of a diameter sufficient to permit passage of worm 62. An oil fill hole 94 is provided through the upper surface of frame 15 into access tunnel 93 at a point beyond worm 62 but adjacent thereto. Just beyond the location of oil fill hole 94 there is provided anti-friction bearing 95 with its inner race mounted on shaft 51 and its outer race on access tunnel 93. Anti-friction bearing 95 is a ball bearing provided with integral oil seals. The inner edge of the inner race of bearing 95 abuts against shoulder 96 provided in shaft 51 for that purpose. Additionally a cylindrical spacer member 97 is provided in close association with shaft 51 between the outer edge of worm 62 and the inner edge of the inner race of bearing 95 to prevent longitudinal movement of worm 62 relative to shaft 51 in the direction of bearing 95.

Beyond bearing 95 the shaft 51 terminates in a threaded section 98. A cooperating nut 101 and lock washer 102 which abuts the outer edge of the inner race of bearing 95 is provided to lock the inner edge of the inner race of bearing 95 against shoulder 96. A transverse slot 103 across the end of shaft 91 may be provided as a power take-off keyway if desired. An O ring 105 which acts as an oil seal is mounted in a groove 105 provided in shaft 51 in contact with the inside of the inner race of bearing 95.

A bearing 95 is held in place in the following manner. Access tunnel 93 is enlarged in diameter forming shoulder 106 near the outer edge of the outer race of bearing 95. A toroidal compressible seal 107 is provided abutting shoulder 106 and the outer edge of the outer race of bearing 95. A cylindrical seal-compressing spacer 108 is provided in close association with the inner wall of access tunnel 93 abutting the outer edge of seal 107. Spacer 108 is provided with a pair of pull out holes 109 to provide for its removal. A second toroidal compressible seal 111 is provided abutting the other end of spacer 108 in close association with the outer wall of tunnel 93. A circular closure disk 112 is provided abutting the outer edge of seal 111. Disk 112 extends entirely across the opening of access tunnel 93. Closure disk 112 is maintained in position by means of retaining ring 113 which abuts the outer edge of disk 112 maintaining disk 112 in a position to keep both seal 111 and 107 under compression. Retaining ring 113 cooperates with groove 114 provided on the inner surface of tunnel 93 for that purpose. In the event that it is desired to use power take-off slot 103 disk 112 is replaced by a hollow ring of equal thickness.

As mentioned above, frame 15 is provided with a cavity 57 adapted to receive drive gear 56. Viewed from the side as in FIG. 3 drive gear receiving cavity 57 is generally circular in shape surrounding drive gear 56 with ample clearance and is provided with an extension at the top to receive worm 62. The lower portion of drive gear receiving cavity 57 acts as an oil sump as indicated by oil 115. The periphery of cavity 57 at least in the circular portion, is provided with a shoulder 116 adapted to cooperate with the mating outstanding shoulder 117 provided in cover plate 55. Cover plate 55 is held in place by a plurality of bolts (not shown) adapted to pass through holes (not shown) provided in cover plate 55 and to engage holes 118 provided in frame 15. A sealing gasket is provided between engaging faces of cover plate 55 and frame 15.

The inner face of cover plate 55 is provided with a raised portion 121 which in turn is provided with a cutaway portion acting as bearing cage 122 adapted to receive anti-friction bearing 123. Bearing 123 is a ball bearing provided with integral oil seals. A bearing loading spring 124 is provided between the outer side of the outer race of bearing 123 and the side wall of bearing cage 122. The inner race of bearing 123 is mounted on bearing mounting sleeve 125 which in turn is keyed to drive shaft 13 by means of key 126. The outer surface of sleeve 125 is provided with an upstanding shoulder 127 adapted to abut the inner edge of the inner race of bearing 123. The inner edge of sleeve 125 abuts the outer surface of drive gear 56. The inner surface of sleeve 125 adjacent the inner edge is provided with a cutaway portion 128 adapted to abut against upstanding shoulder 129 provided in drive shaft 13. Thus the side thrust exerted by bearing loading spring 124 is exerted both against shaft 13 and gear 56.

Gear 56 is keyed to shaft 13 by means of key 131 and any motion of gear 56 relative to shaft 13 in a direction toward cover plate 55 is prevented by abutting contact of gear 56 with retaining ring 132 which cooperates with groove 133 provided in shaft 13 just inside shoulder 129. Retaining ring 132 is located within cutaway portion 128.

Inner wall 58 of frame 15 is provided with an outwardly extending portion 134 through which an aperture for the passage of shaft 13 is provided. As shoulder 135 is provided on the inner wall of the aperture through portion 134 serving as a bearing cage to receive bearing push out ring 136 which abuts shoulder 135 on one edge and the outer race of anti-friction bearing 137 on the other edge. Bearing 137 is a ball bearing provided with integral oil seals. The inner race of bearing 137 is mounted on bearing mounting sleeve 138 which is mounted on shaft 13. Bearing mounting sleeve 138 is provided with an outwardly extending portion 139 which abuts the outer edge of the inner race of bearing 137 on one side and the inner edge of gear 56 on the other. A drive key pin 141 mounted in aperture provided for the purpose is provided between gear 56 and bearing mounting sleeve 138. A cutaway portion 142 is provided in bearing mounting sleeve 138 at the common junction between sleeve 138, shaft 13 and gear 56 to receive an O-ring oil retention seal 143. The end of bearing mounting sleeve 138 opposite gear 56 abuts upstanding shoulder 144 provided in shaft 13. The surface of portion 134 immediately adjacent the outer race of bearing 137 is provided with a groove 145 adapted to receive O-ring oil retention seal 146 and the outer surface of bearing mounting sleeve 138 immediately adjacent the inner face of bearing 137 is provided with a similar groove 147 adapted to receive O-ring seal 148. The face of bearing push out ring 136 adjacent bearing 137 is cut away a little adjacent the inner race of bearing 137 to prevent the possibility of contact between the two.

Driving clutch 151 is mounted on drive shaft 13 in such position that its driving face 152 is located about at the mid-point of shaft 13. Driving clutch 151 is a cylindrical member closing fitting shaft 13 and is keyed to shaft 13 by a key (not shown) to prevent relative rotational movement and is pinned to shaft 13 by retaining pin 153 to prevent lateral movement. Driving face 152 contains a series of rectangular notches 154 spaced equally about the exposed end of clutch 151, and dimensioned such that the width of the notches 154 exceeds slightly the width of the intermediate outstanding portions between the notches 154.

In the space along shaft 13 between the edge of clutch 151 remote from face 152 and the inner edge of the inner race of bearing 137 there is provided a dust collecting bushing 155. Bushing 155 which is in rubbing contact with the surface of shaft 13 is mounted on the inner side of bearing push out ring 136. A cutaway portion 156 with a shoulder is provided on the outer edge of bushing 155 to receive bearing push out ring 136. The outer surface of bushing 155 at a position toward driving clutch member 151 is provided with three concentric dirt collecting rings 157 the function of which will be explained later.

At its opposite end shaft 13 is mounted in frame 14 by means of anti-friction bearing 161. Bearing 161 is a ball bearing provided with integral seals and is mounted with its outer race in an aperture 162 provided in frame 14. A cover cap 163 is provided to extend over aperture 162. Cover cap 163 is held onto the outer face of frame member 14 by means of cap screws 164. The mating surfaces of cap 163 and frame 14 are provided with a sealing gasket.

Cover cap 163 is provided with an inwardly extending boss 165 the side of which cooperates with the edge of aperture to center cover cap 163 in aperture 162. The edge of boss 165 is spaced to lie parallel to the outer edge of the outer race of bearing 161. A bearing loading spring 166 is inserted between the face of boss 165 and the outer race of bearing 161.

The inner race of bearing 161 is mounted on bearing mounting sleeve 167 which is closely associated with, and is keyed by key 168, to shaft 13. Mounting sleeve 167 is provided at an intermediate portion with an upstanding circumferential portion 169, the outer edge of which abuts the inner edge of the inner race of bearing 161.

On the inner side of frame 14 there is mounted a seal holding cage 171. Seal holding cage 171 comprises a cylindrical portion 172 with an upstanding flange 173 adapted to abut the inner side of frame 14 outside the edge of aperture 162, and to be fastened thereto by bolts 174. A sealing gasket is provided between the mating surfaces of flange 173 and frame 14. The inner surface of seal holding cage 171 is provided at the end adjacent bearing 161 with a shoulder 175 adapted to retain one edge of seal 176. The inner surface of seal holding cage 171 extends inwardly from shoulder 175 a sufficient distance to retain therein seals 176, 177 and 178. Seal 176 is a dry dirt seal and comprises a felt ring retained within a circular metallic frame member having a U-shaped cross section. Seals 177 and 178 are water and dirt seals which comprise an upstanding elastomeric member mounted in a circular metal mounting piece having a U-shaped cross-section, the elastomeric portion being provided with an inwardly extending spring loaded elastomeric finger adapted to maintain a peripheral rubbing contact with sleeve 181.

Seal 176 bears against an extension 179 of bearing mounting sleeve 167 which extends beyond upstanding portion 169. A second sleeve 181 is provided on shaft 13 for seals 177 and 178. Sleeve 181 abuts sleeve 167 and acts as an extension thereof. Sleeves 167 and 181 are formed in two parts merely for purposes of assembly and disassembly and sleeve 181 may be keyed to shaft 13 by the same key 168 used for sleeve 167. The back portions of the circular mounting members of seals 176, 177 and 178 are preferably affixed to the inner surface of cylindrical portion 172 of seal holding cage 171 by means of a suitable adhesive.

Cylindrical portion 172 of seal holding cage 171 extends inwardly sufficiently to retain seals 176, 177 and 178. Beyond seal 178 (and beyond the edge of cylindrical portion 172) a fourth seal, oil and water seal 182 is provided. Seal 182 is a circular rubber gasket mounted on sleeve 181. The inner edge of sleeve 182 abuts against upturned shoulder 183 provided in sleeve 181. On the inner side of shoulder 183 a further extension 184 of sleeve 181 is provided having a diameter intermediate between that of the main portion of sleeve 181 and that of shoulder 183. A fifth seal 185 is mounted on extension 184. Seal 185 is an oil and water seal formed of an elastomeric material having an elongated body and an integral upstanding ring which is adapted to bear against the inner side of wheel hub 203.

The driven clutch assembly comprises driven clutch 191, clutch spring 192 and clutch spring retaining collar 193. Clutch spring retaining collar 193 is keyed to shaft 13 by means of key 194 and is prevented from lateral movement relative to shaft 13 toward the left (as shown in FIG. 2) by retaining ring 195 which fits into groove 196 provided in shaft 13 for that purpose. The diameter of shaft 13 is slightly greater beneath the driven clutch assembly than it is beneath sleeves 167 and 181 as indicated at shoulder 197. The end of sleeve 181 abuts the end of clutch spring retaining collar 193 and a groove 198 is provided in the inner portion of sleeve 181 to cause sleeve 181 to clear shoulder 197 and retaining ring 195. The driven face 199 of driven clutch 191 is provided with rectangular notches 201 designed to cooperate in engaging relationship with notches 154 of driving clutch 151. Clutch spring 192 is a coil spring maintained under compression having one end abutting clutch spring retaining collar 193 and the other end abutting the rear edge of driven clutch 191. Spring 192 normally urges driven clutch 191 towards driving clutch 151.

Driven clutch 191 is free to rotate on shaft 13 but is affixed by set screws 202 to wheel hub 203. Wheel hub 203 is a cylindrical member adapted to overlie bushing 155, driving clutch 151, driven clutch 191 and clutch spring retaining collar 193 in close rotational association with each of said elements except driven clutch 191. At an intermediate point the outer surface of wheel hub 103 is provided with an outstanding wheel flange 204 which in turn is provided with wheel rim holding screws 205 for attaching wheel 12 thereto. Wheel 12 is a conventional pneumatic tire assembly and is not shown in the detailed drawing to prevent obscuring essential details.

Wheel hub 203 is secured to driven clutch 191 and is free to rotate independently of axle 13 unless the face 199 of clutch 203 is in engaging contact (with notches 201 in engagement with notches 154) with face 152 of clutch 151. Engagement and disengagement of the clutch is effectuated by moving hub 203 laterally relative to shaft 13 against the force of spring 192 in the case of disengagement. This declutching motion is accomplished by the clutch throw out assembly which comprises clutch throw out ring 206 and clutch operating finger 207. Clutch throw out ring 206 is a ring of low friction material and is mounted on wheel hub 203 in the following manner. The end portion of hub 203 is provided with a section of reduced diameter terminating in shoulder 208. Ring 206 fits over this reduced diameter section with one edge abutting shoulder 208. Ring 206 is held in place by wear ring 209, a cylindrical metal ring which in turn is locked into position by retaining ring 211 whch fits into groove 212 provided in wheel hub 203 for that purpose. The outer diameter of clutch throw-out ring 206 is sufficient that it extends a substantial distance beyond the outer surface of hub 203.

Clutch operating finger 207 which is pivotally mounted at 213 to clutch finger bracket 214 which in turn is mounted on frame 14 by means of bolts 215 is a crank element having a generally horizontally extending arm 216 and a generally vertically extending arm 217. A low friction pressure block 218 is pivotally mounted at 219 to arm 217 in position to rub against the exposed face of clutch throw out ring 206. The free end of arm 216 is pivotally mounted at 221 to clutch pull rod socket 222 which in turn is connected to the end of clutch pull or actuating rod 35. A length adjusting attachment is provided as indicated by threaded portion 223 on rod 35 and nut 224. Thus when clutch actuating lever 34 is depressed against hand grip 29 of handle 21 rod 35 is pulled upwardly forcing block 218 against ring 206 moving hub 203 toward the left (as shown in FIG. 2) removing clutch 191 from contact with clutch 151. Conversely when handle 34 is released spring 192 moves hub 203 toward the right reengaging the clutches.

Upstanding finger 186 of seal 185 engages the inner side of hub 203. Seal 185 is so located that finger 186 remains in contact with hub 203 during its entire lateral movement. At the other end of hub 203 a plurality of seals 225, 226 and 227 are provided about the outside of hub 203 adjacent portion 134 of inner wall 58 of frame 15, to prevent entry of foreign matter into the gear assembly and the associated bearings.

Seals 225 and 226 are spring biased rubver finger oil and water seals similar to seals 177 and 178 and seal 227 is a felt dry dust seal similar to seal 178. Seals 225, 226 and 227 are adhesively mounted on the inner wall of seal holding cage 228. Seal holding cage 228 is attached to the surface of portion 134 by screws 229. The sealing gasket is provided between the mating surfaces of the cage 228 and portion 134. The function of rings 157 in bushing 155 is to catch any little pieces of matter that may wear off seals 225, 226 or 227. Since bushing 155 is mounted on frame 15 it does not rotate. Rings 157 are located within the region of lateral movement of the end of hub 203.

One important feature of this invention is that throughout the assembly wherever two parts are in rubbing contact one of those parts, the easily replaceable one, is made of a less wear resistant material than the other of such parts. For example, bushing 155 which may easily be replaced, is intentionally formed of a softer material than the tool steel used for shaft 13. As mentioned above, assembly and disassembly of cultivator 11 is facilitated by providing for the removal of frame 14.

A major cause for the entry of dirt and dust into the gear assembly and associated bearings is the expansion and contraction of the air and oil in sump 115 comprising the lower portion of cavity 57. If an aperture is provided to equalize the pressures dirt and dust can easily work its way through the aperture. On the other hand, if an attempt is made to seal up cavity 57 then as the air and oil heat up and expand they are forced out presumably along shaft 13 and out into the seals. As the air and oil in the sump cool down and contract dirt and dust might be drawn back into the sump. To prevent either occurrence oil filler hole 94 is provided with a combination air pressure equalizer, oil filter and oil filler spout 241 shown in detail in FIG. 4.

Spout 241 comprises three elements, cylindrical housing 242, equalizer plug 243 and air filter cage 244. Housing 242 is a hollow cylindrical member provided at its lower extremity with an externally threaded portion 245 adapted to engage in the threads of tapped oil filler hole 94 and at an intermediate point with a flat sided portion 246 adapted to receive a wrench or other tool. Equalizer plug 243 is a hollow generally cylindrical element comprising an extended lower portion adapted to fit within housing 242, an intermediate collar 248 having a diameter substantially equal to that of housing 242 and a cap portion 249 above collar 248. Cylindrical lower portion 247 of plug 243 is provided at its lower end with an external upstanding threaded portion 251 adapted to engage and cooperate with an internal upstanding threaded portion 252 of housing 242. Cap 249 is provided with an integral cover 253, flattened side portions 254 and 255 adapted to receive a wrench or other tool, and two air ducts 256 which extend from the opposite edges of cap 249, parallel to and midway between flattened sides 254 and 255 into the central cavity of plug 243. Air ducts 256 each comprise a small drilled hole with its outer end at a substantially lower level than the end in the cavity of plug 243.

Air filter cage 244 is a third hollow cylindrical element adapted to extend upwardly within plug 243. Cage 244 comprises a cap element 257 closed at one end and provided at the other end with an externally threaded portion 258 adapted to engage in and cooperate with internal threaded portion 259 provided at an intermediate position inside plug 243. The end of cap 244 comprises an integral cover 261 and two apertures 262 are provided which extend outwardly through the side wall of cage 244 on opposite sides on a common diameter at a position between cover 261 and the level of the end of plug 243 when cage 244 is in position on plug 243. A cylindrical air filler core 263 made of wire mesh and provided with an integral end 264 is positioned within the cavity of cage 244 and extends beyond the open end of cage 244 substantially the full length of the cavity in plug 243 when cage 244 is in position in plug 243.

The lower portion of housing 242 is provided with an internally extending collar 265 at a level about equal to the threaded portion 245 to provide a shoulder adapted to receive oil strainer 266 a generally circular element made of wire mesh and provided about its periphery with an integral collar adapted to engage the inner wall for housing 242. A rubber gasket 267 is provided between the upper end of housing 242 and the lower edge of collar 248 of plug 243.

To fill the oil sump, equalizer plug 243 is removed from housing 242. The oil is poured down the center cavity of housing 242 and passes through oil strainer 266. With plug 243 inserted in housing 242 air is free to flow into and out of the sump equalizing the pressure therein. However the air can flow only through the passage comprising air duct 256, filter core 263 and apertures 262. The fact that apertures 262 and air ducts 256 extend essentially horizontally prevents the entry from either end of oil, dirt or dust particles in most instances. Any such particles which may pass through either the ducts or the apertures is effectively screened out by filter core 263.

Figure 5:
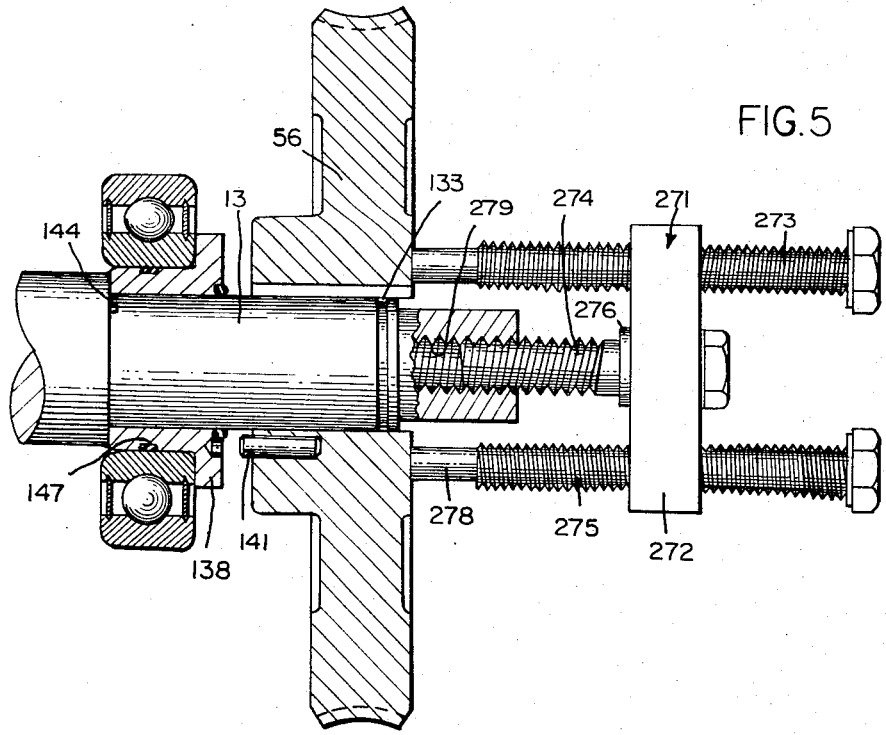
FIG. 5 is an elevation partially in section showing the special tool which is one of the objects of the present invention in use in moving the drive gear from the axle shaft.
Figure 6:
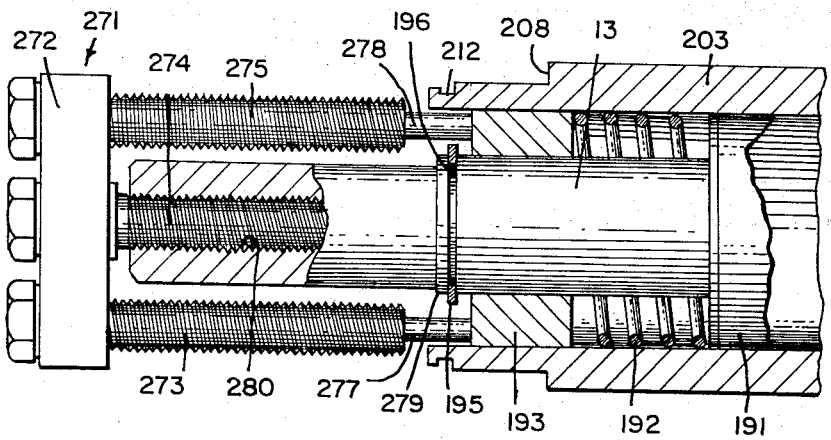
FIG. 6 is an elevation partially in section showing the special tool in use compressing the clutch spring.

Another feature of the present invention is a combination tool 271 shown in FIGS. 5 and 6. Tool 271 comprises a base plate 272 and three parallel elongated bolts 273, 274 and 275 which extend through base plate 272 and are located along a single line with bolts 273 and 275 both spaced an equal distance from bolts 274. Bolts 273 and 275 are substantially longer than bolt 274. The holes in plate 272 for bolts 273 and 275 are both tapped so that as these bolts are turned they move in or out relative to plate 272. Bolt 274 is journalled to plate 272 as indicated at 276 so that the rotation of this bolt does not effect its position relative to plate 272. Bolt 274 is provided with threads to its very end while bolts 273 and 275 are both provided with elongated cylindrical portions 277 and 278 respectively of reduced diameter at their ends.

Tool 271 is especially useful in pressing gear 56 into position on axle 13, or in depressing clutch spring retainer collar 193 either to install or remove retaining ring 197. As shown in FIG. 5 the end of axle 13 near gear 56 is provided with an axially extending internally tapped hole 279 adapted to receive bolt 274. To press gear 56 into position bolt 274 is engaged in hole 279 just sufficiently for full purchase, and the ends of cylindrical portions 277 and 278 of bolts 273 and 275 are brought into engagement with the sides of gear 56. Then by turning bolt 274 into hole 279 gear 56 is forced onto axle 13. As soon as the limit of travel of bolt 274 is reached bolt 274 is backed out of hole 279 part way, bolts 273 and 275 are turned down to again contact the edge of gear 56 and bolt 274 is turned down again to continue to press gear 56 further on to axle 13. This action is repeated successfully until gear 56 is in position.

To remove gear 56 two tapped holes (not shown) adapted to receive bolts 273 and 275 may be provided at opposite sides through the web of gear 56 parallel to the axis of axle 13 in position at the ends of bolt 273 and 275 as they pass through these holes run into contact with the flange portion of bearing mounting sleeve 138. Bolts 273 and 275 are removed from base plate 272, inserted through these holes and turned down to force gear 56 away from sleeve 138.

To employ tool 271 to depress retaining collar 193 as shown in FIG. 6 an axially aligned internally tapped hole 280 adapted to receive bolt 274 is provided in the end of axle 13 nearest collar 193. Bolts 273 and 275 are turned down so their heads abut plate 272 and bolt 274 is turned down into hole 280. Tool 271 is so dimensioned that the cylindrical end portions 277 and 278 of bolts 273 and 275 will enter within shoulder 208 a sufficient distance to depress clutch spring retaining 193 sufficiently to permit the installation or removal of retaining ring 195 in groove 196.

I claim:

1. A power cultivator having
a pair of spaced elongated side frame members, manual control means including a pair of handles, one mounted on each said side frame member and extending in a direction rearwardly of said frame members,
drive means including
a motor mounted between said side frame members at the forward end thereof,
a worm and gear drive mounted within one of said side frame members,
said drive having a worm shaft extending longitudinally of said frame member to a power input means located externally of said frame member adjacent said motor and a gear shaft extending between said side frame members.
a single wheel located between said side frame members,
said wheel mounted on a wheel hub,
said wheel hub mounted coaxially of said gear shaft for movement laterally relative to the side frame members along the common axis,
clutch means mounted coaxially between said gear shaft and said wheel hub,
said clutch means comprising
a driving clutch element attached to said gear shaft,
and a driven clutch element attached to said wheel hub in a position to engage with said driving clutch element,
spring means located between said gear shaft and said wheel hub normally to urge said wheel hub along the common axis in a direction to cause said driven clutch element to engage with said driving clutch element,
clutch control means provided externally of said hub adapted to urge said wheel hub along the common axis in a direction to cause said driven clutch element to disengage said driving clutch element,
said clutch control means comprising
a clutch throw-out ring peripherally upstanding from said wheel hub and having an exposed face normal to said axis and facing the locus of said clutch elements,
a block of low-friction material adapted to bear against the exposed face of said clutch throw-out ring,
and means associated with said handles to move said block in a direction generally along said common axis a distance sufficient to cause said clutch elements to disengage,
and a seal element mounted on the side of each side frame member facing said wheel,
one said seal element bearing against the outer periphery of said gear shaft adjacent the respective said frame member,
the other said seal element bearing against the outer periphery of said wheel hub adajcent the other said frame member.

2. A power cultivator as claimed in claim 1 wherein each said seal element comprises in combination a dry dust seal and two water and dirt seals mounted in a seal cage affixed to the respective said frame member.

3. A power cultivator as claimed in claim 2 wherein said dry dust seal in each instance is a felt seal and wherein said water and dirt seal in each instance includes a spring loaded elastomeric strip adapted to rest under pressure against the rotating part and wherein said seals are arranged in each instance in the order dry dust seal, water and dirt seal, water and dirt seal, with the exposed seal a water and dirt seal.

4. A power cultivator as claimed in claim 2 wherein on the side wherein the wheel element bears against the seal hub, there is additionally provided between said wheel hub and said gear shaft adjacent the edge of said wheel hub, a stationary bushing the outside surface of said bushing being provided with a plurality of grooves adapted to receive any scrap material from said seals.

(References on following page)

References Cited

UNITED STATES PATENTS

| | | | |
|---|---|---|---|
| 1,454,698 | 5/1923 | Byerley | 180—19 |
| 1,923,399 | 8/1933 | Sharp. | |
| 2,535,615 | 12/1950 | Van Ausdall | 180—19 |
| 2,966,974 | 1/1961 | Paskowski et al. | 192—67 |
| 2,991,514 | 7/1961 | Cotchett | 277—187.1 |
| 3,068,051 | 12/1962 | Koch | 308—187.1 |
| 3,140,129 | 7/1964 | Koss | 308—187.2 |

BENJAMIN HERSH, *Primary Examiner.*

J. A. PEKAR, *Assistant Examiner.*